(12) United States Patent  
Rumreich et al.

(10) Patent No.: US 8,189,111 B2
(45) Date of Patent: May 29, 2012

(54) APPARATUS AND METHOD FOR IMAGE PROCESSING IN SPATIAL LIGHT MODULATED DISPLAY SYSTEMS

(75) Inventors: Mark Francis Rumreich, Indianapolis, IN (US); Joel Emerson Stubbs, Long Beach, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 604 days.

(21) Appl. No.: 11/921,705

(22) PCT Filed: Jun. 8, 2005

(86) PCT No.: PCT/US2005/020231
§ 371 (c)(1),
(2), (4) Date: May 4, 2009

(87) PCT Pub. No.: WO2006/135359
PCT Pub. Date: Dec. 21, 2006

(65) Prior Publication Data
US 2009/0316048 A1      Dec. 24, 2009

(51) Int. Cl.
*H04N 5/44* (2011.01)
(52) U.S. Cl. ......... 348/625; 348/690; 348/687; 382/266
(58) Field of Classification Search .......... 348/625–631, 348/606, 678, 681, 707, 712; 382/263, 266
See application file for complete search history.

(56) References Cited

U.S. PATENT DOCUMENTS

| | | | | |
|---|---|---|---|---|
| 4,263,616 A | * | 4/1981 | Lee | 348/627 |
| 5,146,319 A | * | 9/1992 | Engel et al. | 348/712 |
| 6,075,574 A | | 6/2000 | Callway | |
| 6,104,863 A | * | 8/2000 | Strolle et al. | 386/203 |
| 6,597,407 B1 | * | 7/2003 | Taketani et al. | 348/625 |
| 2003/0080985 A1 | | 5/2003 | Kagawa et al. | |
| 2003/0098874 A1 | | 5/2003 | Tobiya | |

(Continued)

FOREIGN PATENT DOCUMENTS

CN  1304522  7/2001

(Continued)

OTHER PUBLICATIONS

Search Report Dated Mar. 3, 2006.

*Primary Examiner* — Michael Lee
(74) *Attorney, Agent, or Firm* — Robert D. Shedd; Harvey D. Fried; Richard LaPeruta

(57) ABSTRACT

Embodiments of the invention provide a circuit for peaking video signals to be provided to a dynamic range limiter for displaying images on a display device. The circuit comprises a peaking filter including a filter input configured to receive a video signal. A first filter output provides a peaking signal for the video signal. A second filter output provides a peaked video signal based upon the peaking signal. The circuit further comprises a throttle circuit including a throttle input coupled to the second filter output. A throttle output provides a throttle signal based upon the peaked video signal. A scaler is coupled between the first filter output and the dynamic range limiter. The scaler is further coupled to the throttle output. The scaler adjusts the peaking signal based upon the throttle signal. Accordingly, peaking is adaptively applied to the video signal based upon the dynamic range limits of the dynamic range limiter, as well as variations in brightness of the input signal over portions of the displayed image.

13 Claims, 8 Drawing Sheets

U.S. PATENT DOCUMENTS

| | | |
|---|---|---|
| 2003/0151565 A1 | 8/2003 | Kim et al. |
| 2004/0032419 A1 | 2/2004 | Zhou et al. |
| 2004/0036703 A1 | 2/2004 | Aoki et al. |
| 2004/0201561 A1 | 10/2004 | Funamoto et al. |

FOREIGN PATENT DOCUMENTS

| | | |
|---|---|---|
| EP | 1111578 | 6/2001 |
| EP | 1482475 | 12/2004 |
| JP | 2000-172218 A | 6/2000 |
| JP | 2001-134226 A | 5/2001 |
| JP | 2002-6825 A | 1/2002 |
| JP | 2003-131641 A | 5/2003 |
| JP | 2003-162270 A | 6/2003 |
| JP | 2005062679 | 3/2005 |
| JP | 2005122217 | 5/2005 |
| JP | 2006284972 | 10/2006 |

* cited by examiner

APPARATUS AND METHOD FOR IMAGE PROCESSING IN SPATIAL LIGHT MODULATED DISPLAY SYSTEMS

This application claims the benefit, under 35 U.S.C. §365 of International Application PCT/US2005/020231, filed Jun. 8, 2005, which was published in accordance with PCT Article 21(2) on Dec. 21, 2006 in English.

FIELD OF THE INVENTION

The present invention generally relates to apparatus and methods for image processing in display systems, and in particular to apparatus and methods for processing image data in spatial light modulated display systems.

BACKGROUND OF THE INVENTION

Spatial Light Modulating (SLM) systems include Digital Light Processing™ (DLP™) systems. DMD and DLP™ are trademarks of Texas Instruments Corporation. Recent developments in SLM technology rely on SLM elements that provide diamond shaped pixels instead of square shaped pixels. Processing techniques for SLM systems include a so called "smooth pixel" processing technique. According to the smooth pixel technique, a displayed image is formed by combining a first set of pixels with a second set of pixels. The second set is displaced from the first set. The combined first and second sets form a displayed image.

In one example SLM system, an array of SLM elements provides first and second pixel sets for each incoming picture, or frame, to be displayed. The combined pixels from the first and second pixel sets provide more displayed pixels than the number of SLM elements in the array.

However, a drawback is associated with this technique. Pixels of the first set effectively overlap pixels from the second set in the displayed image. As a result, light in the regions of overlapping pixels is a combination of light from each of the overlapping pixels. This sometimes results in brighter than intended, or less bright than intended image portions. To address this issue commonly assigned co-pending application no. PCT/US2005/09621 filed on Mar. 22, 2005 by common inventor Rumreich describes an inventive filter and method to counter the effects of overlapping pixel brightness. Applicants' inventive filter has been found to improve images provided by smooth pixel type display systems.

With pixel brightness filtering techniques, any brightness change to the pixel, or gain applied to the pixel during brightness processing of the pixel, can cause the resulting pixel intensity to exceed the maximum value of which the display is capable. In that case, values exceeding the maximum value are typically clipped, for example by a limiter circuit, at the maximum value. Clipping the pixel output intensity to this maximum value creates false contours and other artifacts since some of the intensity information is lost. Therefore, circuits and methods to allow pixel brightness processing to enhance image quality, while at the same time minimizing clipping, are needed.

SUMMARY OF THE INVENTION

Embodiments of the invention provide a circuit for peaking video signals to be provided to a dynamic range limiter for displaying images on a display device. The circuit comprises a peaking filter including a filter input configured to receive a video signal. A first filter output provides a peaking signal for the video signal. A second filter output provides a peaked video signal based upon the peaking signal. The circuit further comprises a throttle circuit including a throttle input coupled to the second filter output. A throttle output provides a throttle signal based upon the peaked video signal. A scaler is coupled between the first filter output and the dynamic range limiter. The scaler is further coupled to the throttle output. The scaler adjusts the peaking signal based upon the throttle signal. Accordingly, peaking is adaptively applied to the video signal based upon the dynamic range limits of the dynamic range limiter, as well as variations in brightness of the input signal over portions of the displayed image.

BRIEF DESCRIPTION OF THE DRAWINGS

Embodiments of the present invention will be described below in more detail, with reference to the accompanying drawings, in which:

FIG. 4A is a diagram illustrating a first pixel set of adjusted pixel data according to an embodiment of the invention.

FIG. 4B is a diagram illustrating a second pixel set of adjusted pixel data according to an embodiment of the invention.

FIG. 4C is a diagram illustrating a pixel matrix comprising the first and second pixel sets illustrated in FIGS. 4A and 4B.

DETAILED DESCRIPTION

Spatial Light Modulator (SLM) devices find increasing use in a wide range of imaging applications such as video image projection and printing. Typical spatial light modulators include devices such as Liquid Crystal Devices (LCD) and digital micro-mirror devices (DMD™). A typical spatial light modulator comprises a two-dimensional array of modulator elements that operate upon incident light in order to form a two-dimensional image on a display surface. LCD based devices use light polarization characteristics in order to modulate each light element in the array. DMD™ based devices use an array of tiny micro-mirrors to modulate individual light elements. Each element in a spatial light modulator array exhibits a variable light intensity in response to a corresponding drive voltage level. In one embodiment of the invention, each element in an SLM array corresponds to at least one pixel of a displayed image.

Figure 1:
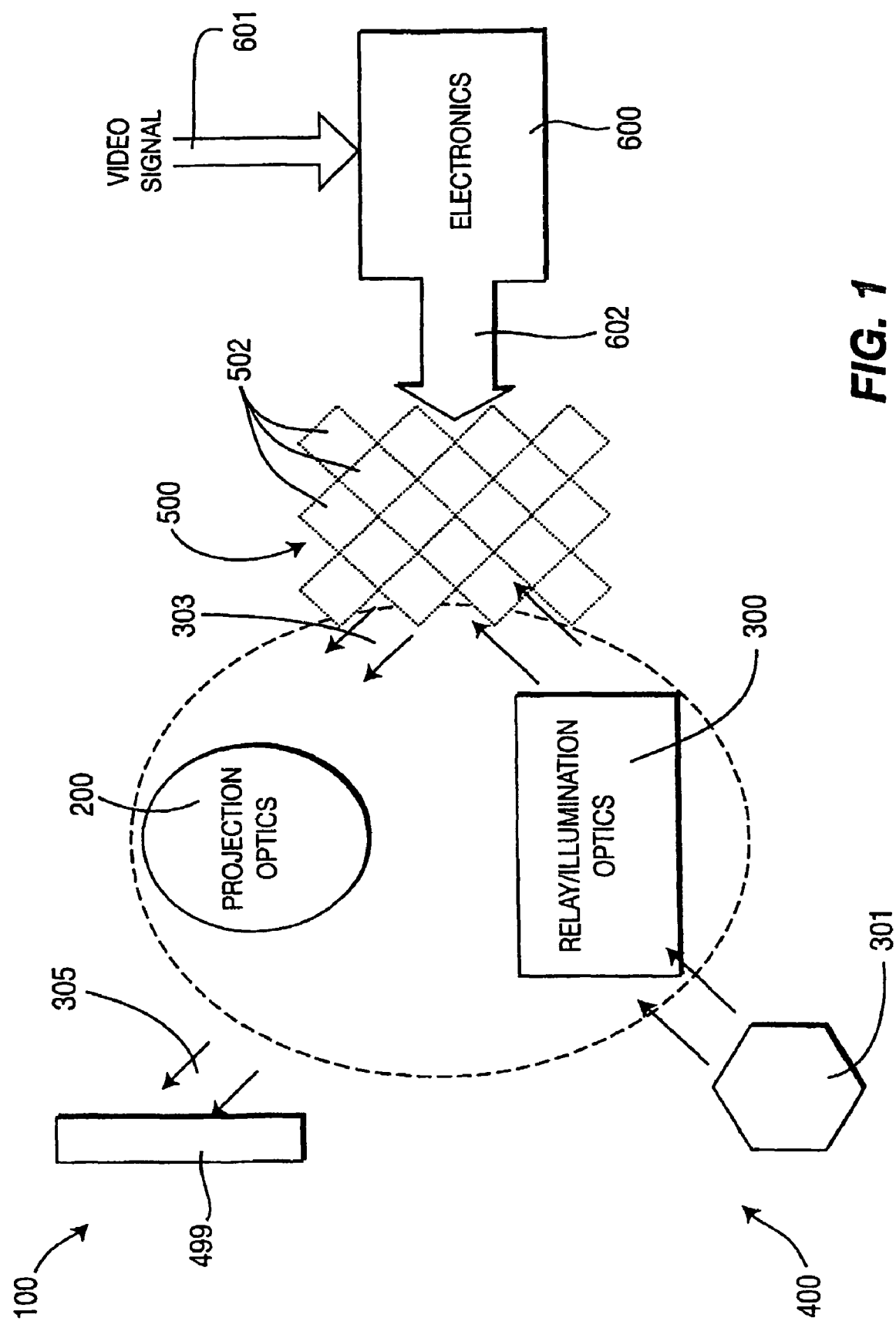
FIG. 1 is a block diagram illustrating a display system including an array of spatial light modulation (SLM) elements suitable for implementing various embodiments of the invention.

FIG. 1 is a pictorial diagram illustrating an example system 100 including a Spatial Light Modulating (SLM) array 500 suitable for implementing various embodiments of the present invention. System 100 comprises at least one light source 301 coupled to an optical system 400. Optical system 400 comprises relay and illumination optics 300 and projection optics 200. Optical system 400 includes at least one array 500 of spatial light modulating elements 502. According to an embodiment of the invention array 500 comprises a semiconductor-based array of reflective light elements 502. According to one embodiment of the invention, SLM array 500 comprises a binary Pulse Width Modulated (PWM) array 500 of light switching elements 502. In one embodiment, elements 502 of PWM array 500 comprise micro-electromechanical system (MEMS) devices, for example, mirrors of a Digital Micro-mirror Device™ (DMD)™.

An electronics subsystem 600 includes an input for receiving a video signal 601 and an output coupled to the SLM array 500. Electronics subsystem 600 processes incoming video signal 601 so as to provide PWM signals to drive elements 502 of array 500. The PWM signals control the angle and dwell time of elements 502 of array 500 in accordance with pixel values provided by video signal 601. Properties, for example, brightness, of pixels displayed on display screen 499 are related to the dwell time of respective corresponding micro-mirror elements 502.

Electronics subsystem 600 receives a video signal 601 from a source of video signals (not shown). Video signal 601 comprises video image data corresponding to video images to be projected and displayed on display device 499. Electronics subsystem 600 processes video signal 601 and provides a processed video signal 602 to drive array 500.

Optics system 400 comprises at least one relay and illumination optics portion 300, at least one projection optics portion 200 and at least one light source 301. Light from light source 301 is transmitted through at least one relay optics portion 300. Light from relay optics portion 300 is projected onto light reflecting elements 502 of SLM array 500.

According to embodiments of the invention, video signal 601 is provided by at least one of a wide variety of suitable video signal sources. Suitable video signal sources include for various embodiments of the invention are too numerous to recite in total. However, some examples include, but are not limited to, digital versatile disk (DVD) systems, set top boxes, broadcast video sources, Internet video sources, cable video sources, satellite video sources, wireless and telephonic sources, to name but a few. Embodiments of the invention comprise digital video intermediate systems wherein video sources include film, telecines, video masters and the like.

Regardless of video signal source, suitable video signals 601 for embodiments of the invention include, among others, analog video signals, digital video signals, component video signals and composite video signals. Suitable signal formats include, among others, National Television Standards Committee (NTSC) format, Phase Alternate Lines (PAL) format, and PAL plus format. Any video format providing pixel values corresponding to pixels of an image to be displayed is suitable for use in various embodiments of the invention.

Figure 2:
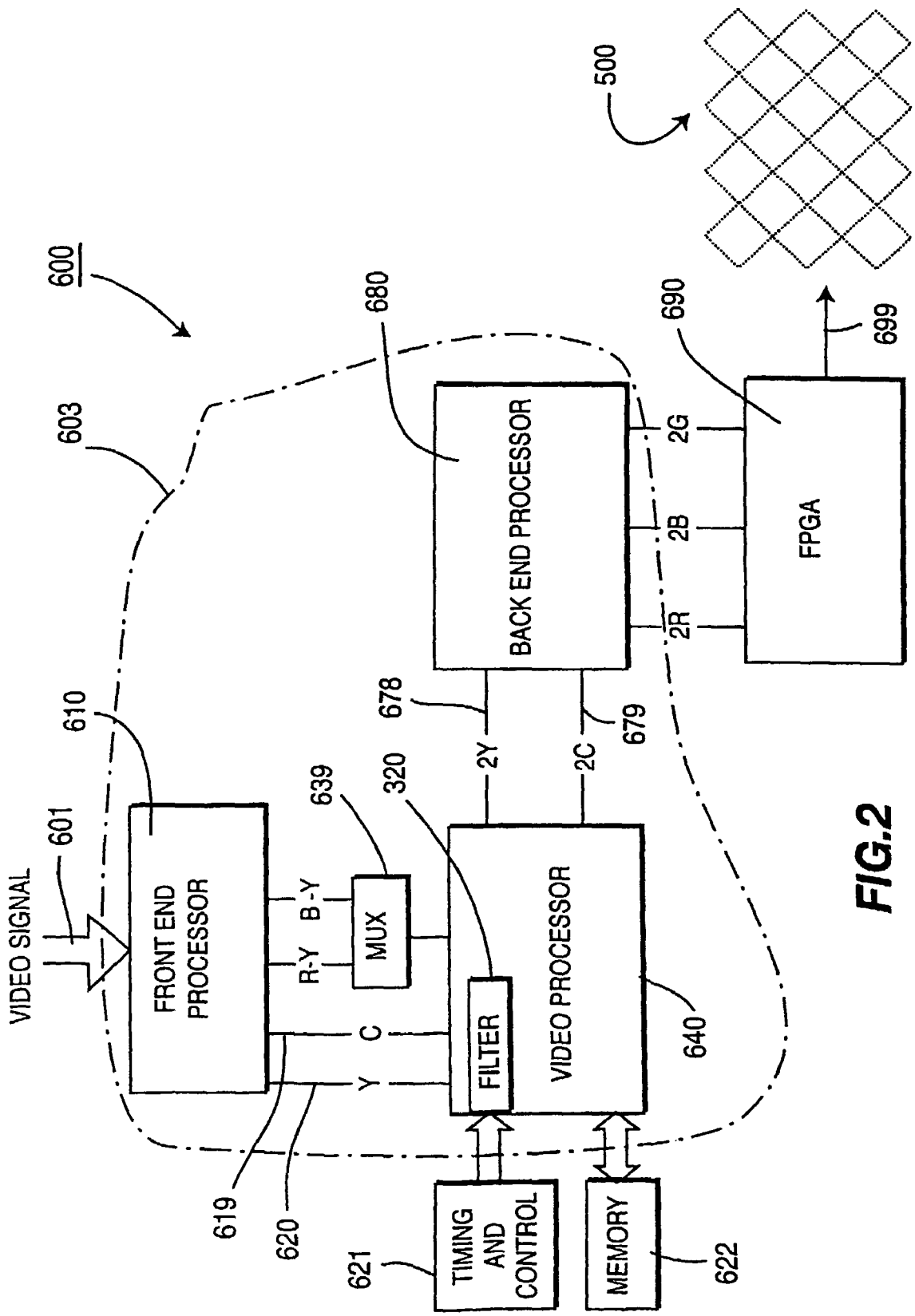
FIG. 2 is a block diagram illustrating in more detail the electronics subsystem of the display system illustrated in FIG. 1.

FIG. 2 illustrates functional blocks of the electronics subsystem 600 illustrated in FIG. 1 according to an embodiment of the invention. Electronics subsystem 600 comprises a receiver 610 for receiving video signal 601. Receiver 610 is coupled to video processing unit 640. Video processing unit 640 is coupled to SLM array driver 690.

According to embodiments of the invention, receiver 610 receives video signal 601 at an input. In an example embodiment of the invention, receiver 610 decodes video signal 601 and performs Analog to Digital (A/D) conversion, Luminance-chrominance separation (Y/C separation), and chrominance demodulation of video signal 601 in accordance with conventional video signal receiving and decoding techniques.

According to embodiments of the invention, video processing unit 640 further provides video processing functions, for example, progressive scan conversion, and re-sampling of video signal 601 in accordance with conventional techniques. Video processing unit 640 is coupled to an SLM device driver 690. SLM device driver 690 provides drive signals for driving elements 503 of SLM array 500. According to an embodiment of the invention, video processor provides enhanced Chrominance (2C) and Luminance (2Y) signals for use by driver 690 in driving elements 503 of array 500 so as to modulate light in accordance with video signal 601.

Video processing unit 640 includes pixel filter 320 coupled to a pixel group generator 680. In one embodiment of the invention, pixel group generator 680 is a conventional device providing pixel groups for so called, "smooth pixel" processing techniques. According to one embodiment of the invention, pixel filter 320 is implemented by programming a processor of video processing unit 640 so as to implement pixel processing functions in accordance with the various embodiments of the invention described herein. In alternative embodiments of the invention, functions of pixel filter 320 are provided by hardware without the need for programming a processor. Still other embodiments of the invention implement some functions of pixel filter 320 in hardware while other functions are implemented by a processor programmed for carrying out the other functions. However, as those of ordinary skill in the art will readily appreciate upon reading the specification herein, a wide variety of hardware and software combinations will be suitable for implementing the invention. Therefore, the pixel filter of the invention is not limited to one specific hardware and processor arrangement.

According to one embodiment of the invention, receiver portion 610 provides luminance (Y) signals 620 to pixel filter 320 based upon video signal 601. According to one embodiment of the invention, receiver portion 610 provides chrominance (C) signals 649 to pixel filter 320 based upon video signal 601.

In some embodiments of the invention, video signal processor 640 provides further processing functions including, for example, color space conversion, gamma correction removal, error diffusion, on screen display capability, Red, Green, Blue (RGB) input receiving capability, and user operable image controls. In one embodiment of the invention, driver 690 includes a Field Programmable Gate Array (FPGA).

In one embodiment of the invention Field Programmable Gate Array (FPGA) 690 receives RGB video signals from video signal processor 640 and provides PWM control functions, image reformatting, bit plane conversion and DMD drive signal functions based, at least in part, on the RGB video signals. According to embodiments of the invention, system 600 further comprises memory 622 and timing and control circuits 621 for electronics subsystem 600.

As will be readily appreciated by those of ordinary skill in the art processors are commonly embedded throughout systems in a wide variety of configurations and capabilities. Any processor configuration implementing the inventive circuits, systems and methods described herein remain within the scope of the invention.

Figure 3:
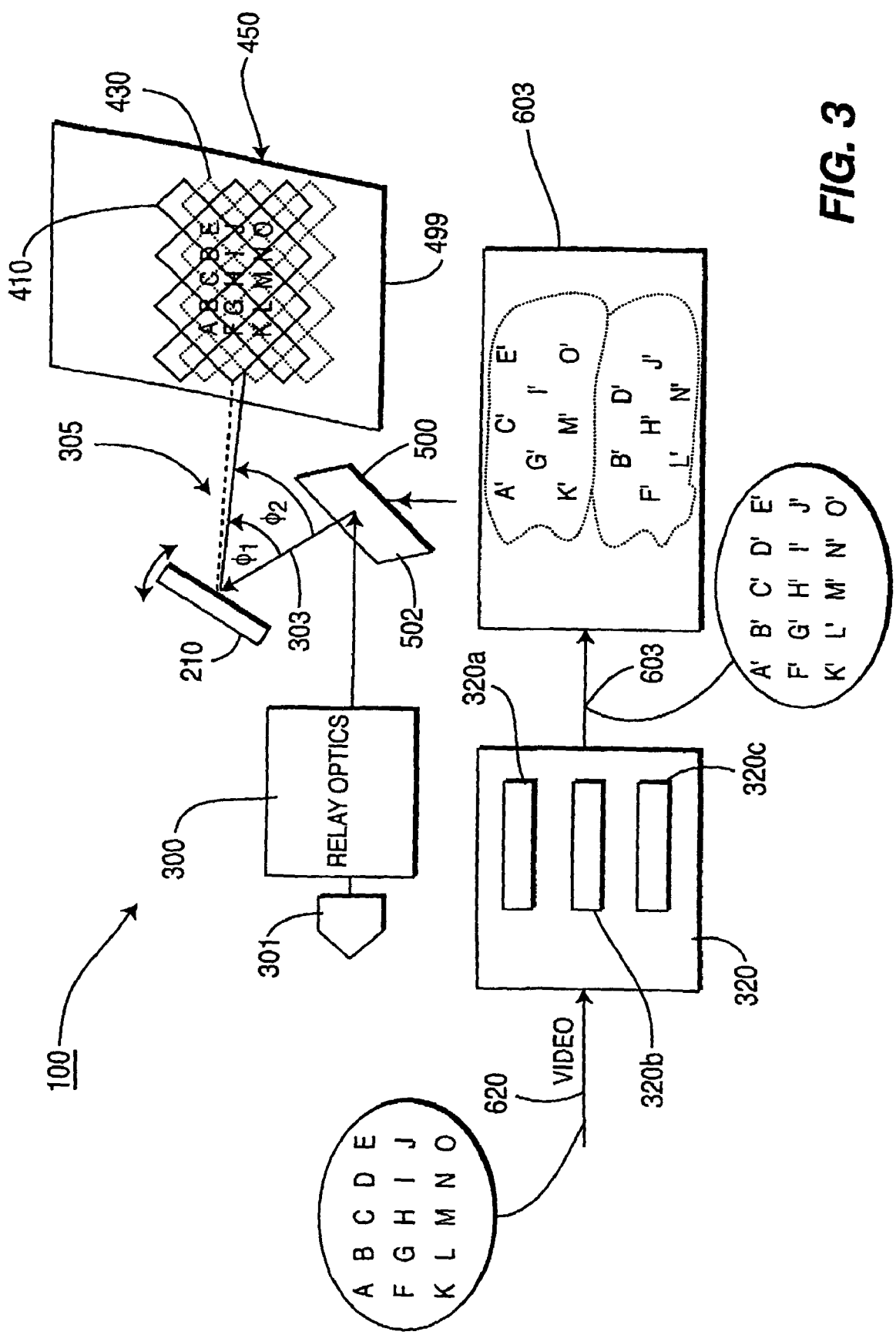
FIG. 3 is a block diagram illustrating an SLM system including a pixel filter according to an embodiment of the invention.

FIG. 3 is a block diagram illustrating an embodiment of the invention. Display screen 499 is arranged with respect to SLM array 500 so as to display an image comprising a matrix 450 of pixels. Matrix 450 comprises at least a first pixel group 410 and a second pixel group 430. (also illustrated in FIG. 4). According to alternative embodiments of the invention, matrix 450 comprises more than two pixel groups. According to an embodiment of the invention, the number of pixels comprising matrix 450 is greater than the number of elements 502 of SLM array 500 used to provide first and second pixel groups 410 and 430.

As illustrated in FIG. 3, light from a light source 301 is transmitted through relay optics subsystem 300. In one embodiment of the invention, optics subsystem 300 includes a means for providing colored light. According to one embodiment of the invention, optics subsystem 300 includes a color wheel alternately producing red, green and blue light. According to an alternative embodiment of the invention, light source 301 comprises a red light source, a green light source and a blue light source. The colored light is projected onto array 500 and reflected from array 500. Light reflected from array 500 is provided to display 499 via projection optics subsystem 200.

Elements 502 of array 500 are driven in accordance with pixel values provided by pixel data set 620. Each pixel of matrix 450 corresponds to a pixel value of incoming pixel data set 620. Pixel data set 620 is generated based upon video signal 601. In FIG. 3 pixel data set 620 is represented by an arrangement of letters A through O.

Pixel processor 320 adjusts pixel values of pixel data set 620 and provides adjusted pixel data set 678 to pixel group generator 675. In FIG. 3 adjusted pixel data set 678 is represented by an arrangement of letters A' through O'. Pixel group generator 675 separates adjusted pixel data set 678 into first and second pixel data groups (679 and 680). In one embodiment of the invention, pixel group generator 675 operates in accordance with a known pixel processing technique such as a "smooth pixel' processing technique. According to smooth pixel processing, an input pixel data set, for example, 620 is separated into first and second pixel data groups. The first and second pixel data groups provide first and second pixel groups comprising a displayed matrix.

However, conventional pixel processing techniques do not include pixel filter 320, nor do conventional systems provide an adjusted pixel data set 678 to a pixel generator 675. Accordingly, first and second pixel groups 410 and 430 comprising matrix 450 according to the invention provide significant advantages over conventional smooth pixel processing techniques.

Figure 4:
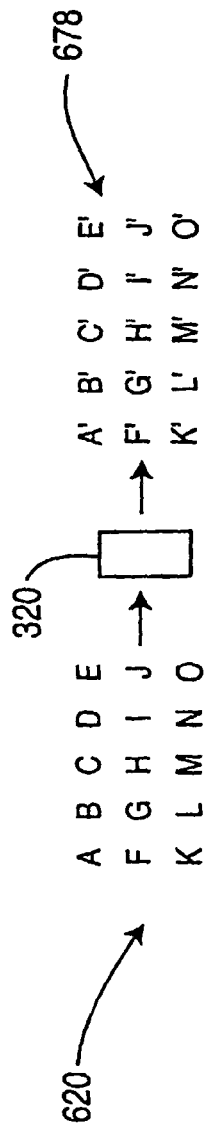
FIG. 4 is a diagram illustrating relationship between received pixel data, and adjusted pixel data.
Figure 4:
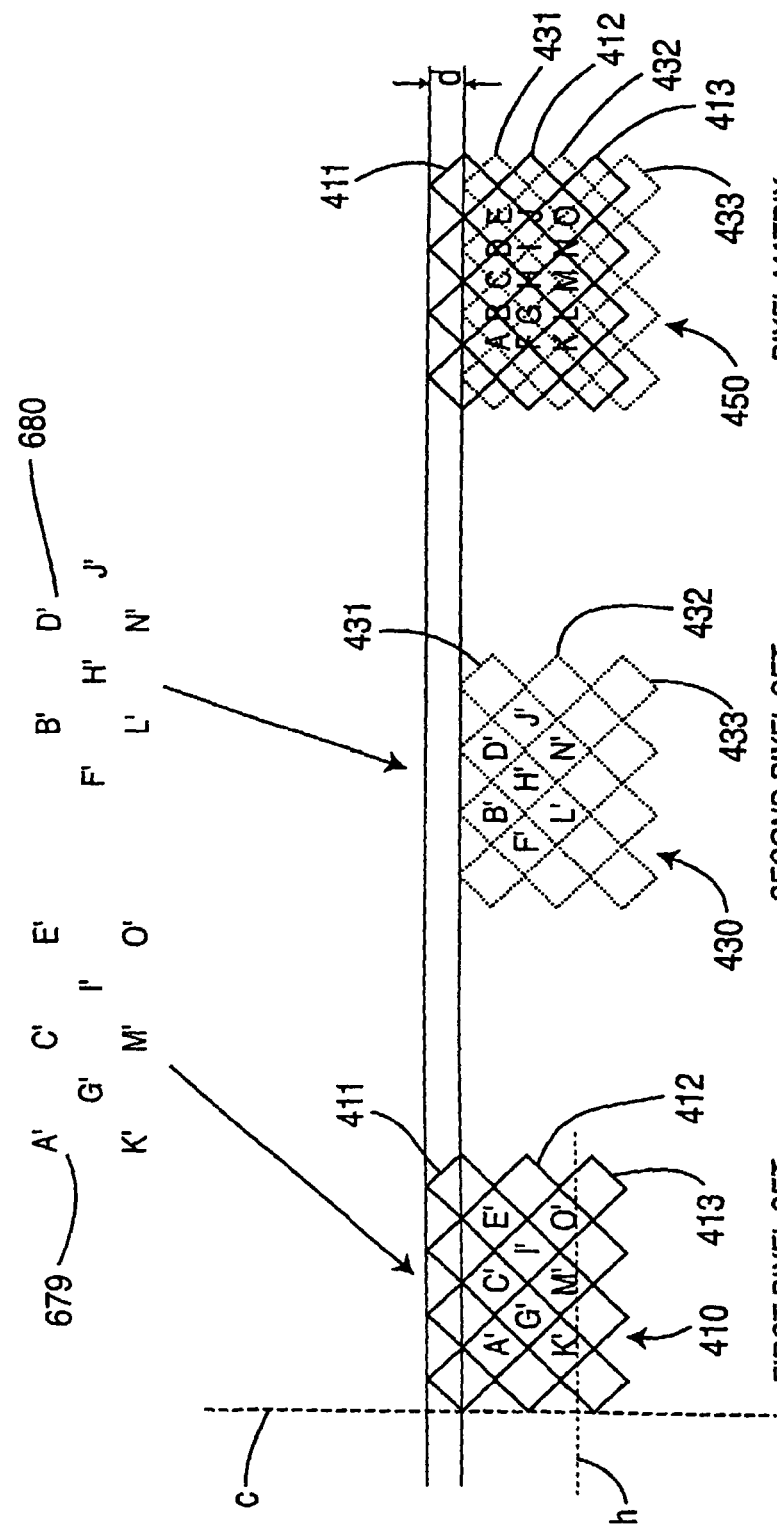

FIG. 4 illustrates the relationship between pixel data set 620, adjusted pixel data set 678, pixel data groups 679 and 680, pixel groups 410 and 430, and pixel matrix 450 according to an embodiment of the invention. As illustrated in FIG. 4, first pixel group 410 comprises rows h and columns c of adjacent pixels 412. For convenience, a single indicator 412 indicates individual pixels of group 410. Second pixel group 430 comprises rows h and columns c of adjacent individual pixels 432.

Pixel groups 410 and 430 are projected onto display screen 499 so as to appear displaced from each other, for example, by a distance d. In one embodiment of the invention, pixel groups 410 and 430 are displaced from each other in a direction substantially in x-direction of the plane of the surface of display screen 499.

In one example embodiment of the invention, second group 430 is displayed spaced from first pixel group 410 by a distance equal to about half of the height of a single pixel. The resulting pixel matrix 450 therefore comprises overlapping pixels. In other words, individual pixels from first pixel group 410, overlap individual pixels from second pixel group 430.

In one embodiment of the invention, SLM elements 502 comprise diamond shaped elements. Therefore, pixels of matrix 450 comprise substantially diamond shaped pixels (example illustrated in FIG. 4). However, other pixel shapes, e.g. square pixels, are known, and are suitable for some applications of the invention.

FIG. 3 illustrates an optical element 210 as one example of conventional means for providing the spacing for pixel groups 410 and 430. Optical element 210 reflects one of pixel sets 410 and 430 onto screen 499 at a first angle $Ø_1$. Optical element 210 subsequently projects the other pixel set at a second angle $Ø_2$. This technique has the advantage of providing a matrix 450 with more displayed pixels than the number of available elements 502 on SLM device 500. In one embodiment of the invention, the number of pixels comprising matrix 450 is about twice the number of available micro-mirrors 502 of SLM device 500.

However, the technique described above results in overlapping pixels. Light from each of the overlapping pixels combines. Therefore, the displayed brightness for a given pixel sometimes fails to correspond to the brightness value provided in pixel data set 620. In some cases the displayed brightness of overlapping pixels is greater than the intended brightness. In other cases, the displayed brightness of overlapping pixels is less than the intended brightness.

According to an embodiment of the invention pixel data set 620 is provided to pixel filter 320. Filter 320 provides modified pixel data set 678. Pixel data groups 679 and 680 are formed from modified pixel data set 678. The pixel values of pixels of pixel data groups 679 and 680 are used to generate pixel groups 410 and 430 respectively. Displayed combined pixel groups 410 and 430 comprise matrix 450.

In accordance with an embodiment of the invention, pixel filter 320 provides adjusted example data set 678 as represented by the following diagram:

A' B' C' D' E'

F' G' H' I' J'

K' L' M' N' O'

First pixel data group 679 comprises pixel data labeled A', C', E', G', I', K', M', O. Second pixel data group 680 comprises pixels labeled B', D', F', H', J', 'L, N'. Pixel groups 410 and 430 are generated based on pixel data groups 679 and 680 respectively. Matrix 410 comprises first pixel group 410 and second pixel group 430.

As can be seen from the drawing of matrix 450, pixels from the first pixel group 410 at least partially overlap pixels of pixel group 430 and vice versa. For example, the G pixel position in the first pixel group 410 is overlapped by the B, F. L and H pixel positions from the second pixel group 430. This overlap causes intensity distortion of the image represented by matrix 410.

Figure 5:
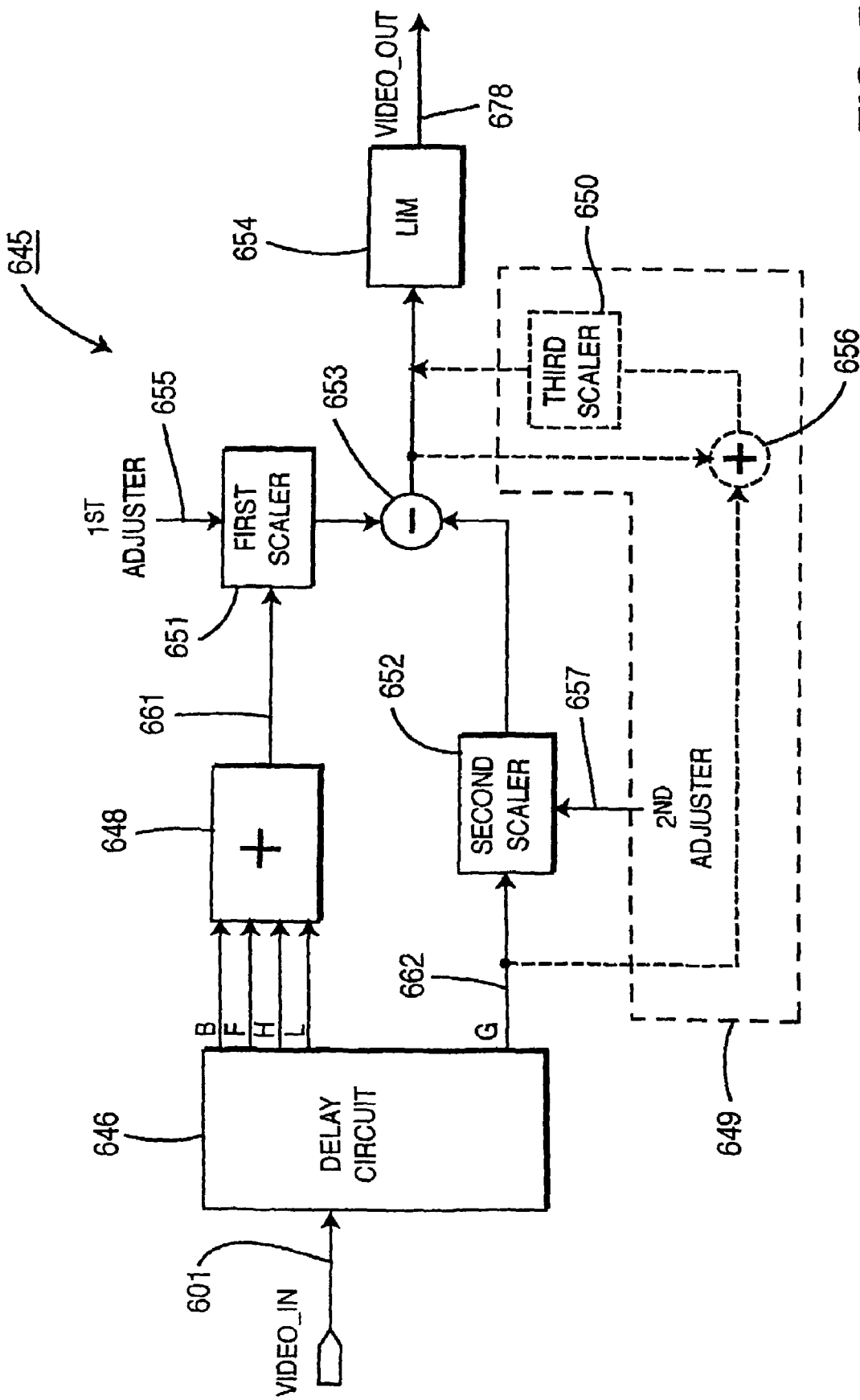
FIG. 5 is a block diagram of a pixel filter according to an embodiment of the invention.
Figure 7:
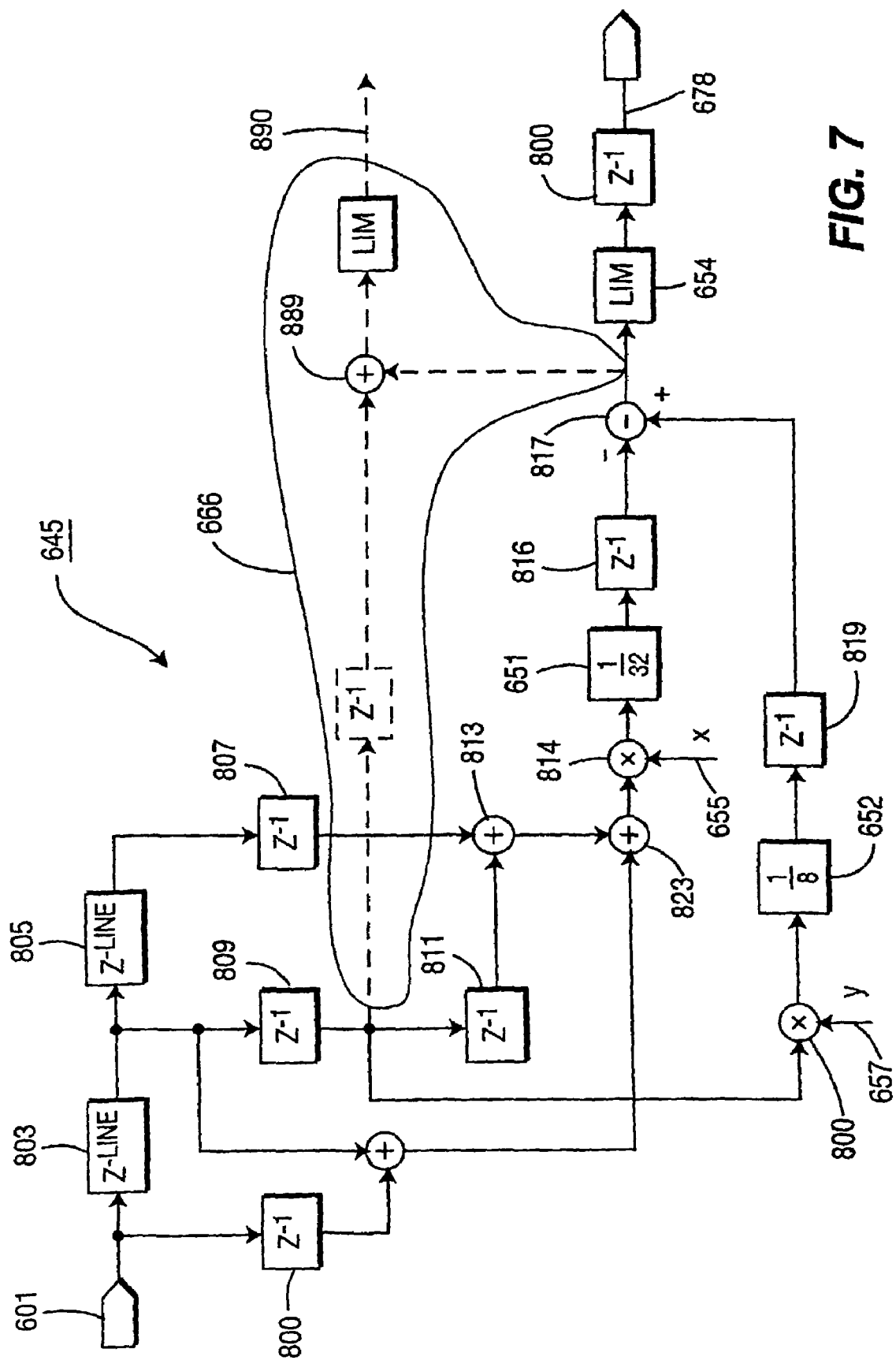
FIG. 7 is a detailed diagram of an embodiment of the pixel data processor illustrated in FIG. 5.

According to an embodiment of the invention, distortion in pixel intensity caused by the overlap is reduced by an image enhancing filter arrangements 320 illustrated in FIGS. 3, 5 and 7.

FIG. 5 illustrates an embodiment of a pixel filter 320 according to an embodiment of the invention. Pixel filter 320 comprises at least one two-dimensional filter that operates on respective pixels of pixel data set 620 in accordance with an array h given by:

$$\begin{matrix} & -\alpha & \\ -\alpha & \beta & -\alpha \\ & -\alpha & \end{matrix}$$

wherein β is a scaling factor associated with a pixel of pixel data set 620 from which the intensity distortion is to be removed; and α is a scaling factor for pixels overlapping the pixel of pixel data set 620 from which the intensity distortion is to be removed.

More particularly, filter 320 adjusts intensity values I of respective pixels of data set 620 by an amount sufficient to compensate for the intensity contribution of pixels overlapping a respective pixel in matrix 450. For example, in FIG. 4, the intensity ($I_G$) of pixel G in pixel data set 620 is scaled by an amount (β) such that the intensity distortion caused by overlapping pixels B ($I_B$), F ($I_F$), L ($I_L$) and H ($I_H$) in displayed matrix 450 is reduced. In an embodiment of the present invention, adjusted pixel G' has an adjusted intensity value $I_{G'}$ in accordance with the relationship illustrated below:

$$I_{G'} = \beta(I_G) - \alpha(I_H + I_L + I_B + I_F) \quad (1)$$

Wherein:

β is a scaling factor associated with the pixel G from which the intensity distortion is to be removed; and α is a scaling factor associated with overlapping pixels that are contributing to the intensity of pixel G.

According to one embodiment of the invention, a relationship between β and α is given by: β=1+4α. This relationship provides unity DC gain. However, the invention is not limited in this regard. In one embodiment of the invention, α is approximately +1/8 and β is approximately 3/2. Selecting these example scaling factors has been found to provide unity DC gain while compensating for distortion in some embodiments of the invention.

According to the example above, the pixel data for the example data set 620, and the adjusted data set 678 is represented as follows:

$$\begin{matrix} A & B & C & D & E \\ F & G & H & I & J \\ K & L & M & N & O \end{matrix} \rightarrow \begin{matrix} A' & B' & C' & D' & E' \\ F' & G' & H' & I' & J' \\ K' & L' & M' & N' & O' \end{matrix}$$

FIG. 5 is a block diagram illustrating an example filter arrangement 320 representing one of three like filters 320a, 320b, 320c illustrated in FIG. 3. Filter 320 implements the relationship described in equation 1 above for each pixel in respective red, green and blue components of component video signal 620. For convenience, the operation of one filter 320 will be described in relation to an example pixel G. Overlapping pixel groups 410 and 430 as shown in FIG. 4. are referred to herein as an example for purposes of discussion. However, it will be understood that each of the pixels comprising incoming pixel set 620 are suitable for processing in the same way to remove intensity distortion caused by overlapping pixels.

Referring to FIG. 5, a pixel filter 320 according to an embodiment of the invention is illustrated. Pixel filter 320 comprises a delay circuit 646. Delay circuit 646 receives pixel data of pixel data set 620. Delay circuit 646 delays the received pixel data so as to provide pixel data for a plurality of pixels substantially simultaneously. In the example illustrated in FIG. 5, delay circuit 646 provides pixel data for pixels H, L, F and B (overlapping example pixel G in matrix 450.) to adder 648. At the same time, delay circuit 646 provides data for example pixel G to a second scaler 652. Adder 648 provides an output representative of the sum of pixel values for pixels H, L, F and B to a first scaler 651. First scaler 651 applies a scaling factor α to its input to provide a scaled output. Second scaler 652 applies a scaling factor β to its input to provide a scaled output. The scaled outputs of scalers 651 and 652 are combined by subtractor 653. The difference output of subtractor 653 represents an adjusted value G' for example pixel G. According to one embodiment of the invention, the difference output of subtractor 653 is optionally provided to a limiter. In that case, successive output values provided by limiter 654 comprise adjusted pixel data set 678.

According to one embodiment of the invention, a scaling factor for first scaler 655 is adjustable by an adjustment factor X provided by first adjuster, 655. According to one embodiment of the invention, a scaling factor for the second scaler 652 is adjustable by an adjustment factor Y provided by second adjuster 657.

Figure 6:
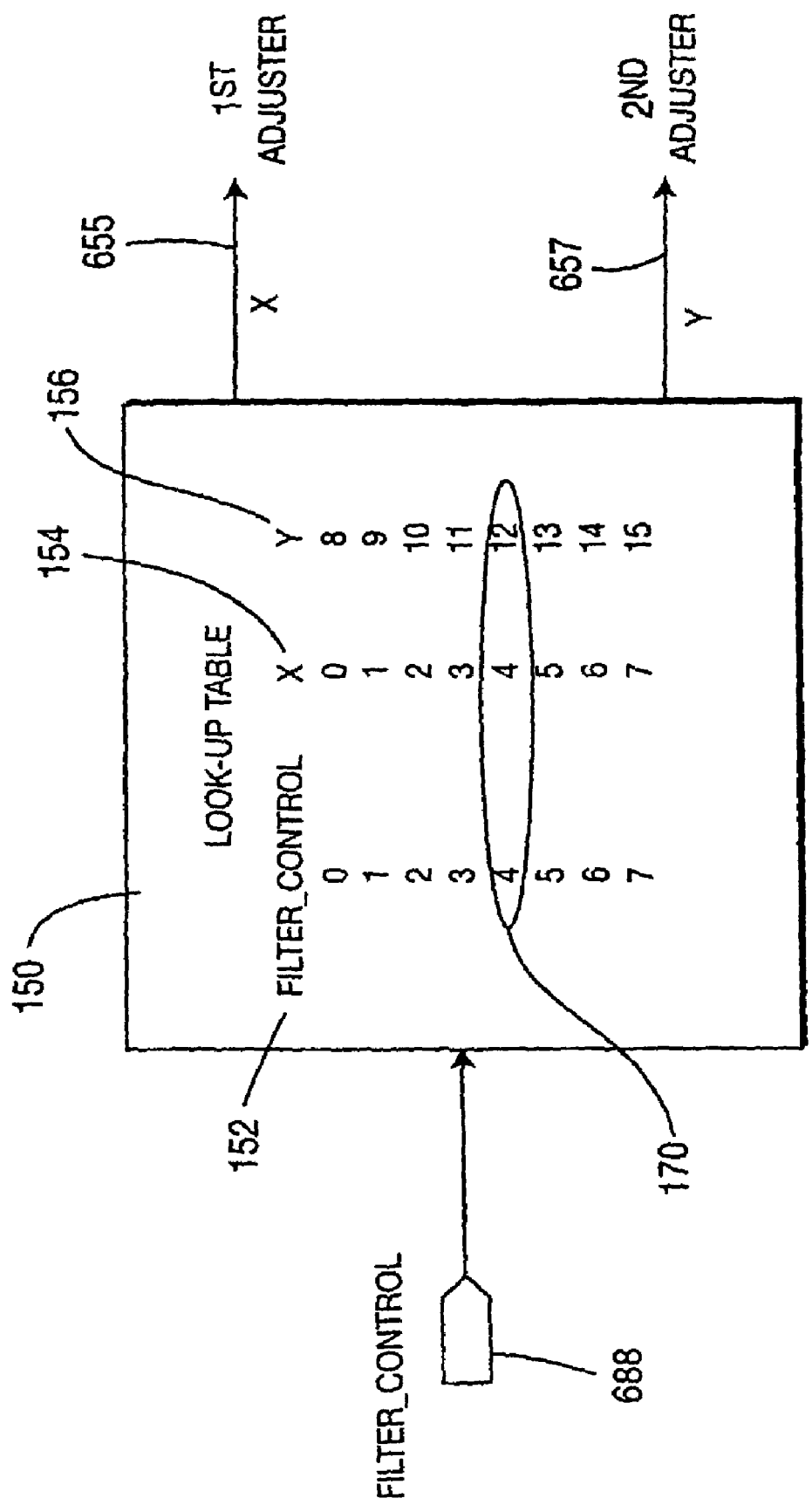
FIG. 6 illustrates an example lookup table suitable for use in the pixel data filter of FIG. 5 according to an embodiment of the invention.

FIG. 6 illustrates a pixel filter control circuit 700 for implementing an embodiment of pixel filter 320 including adjustable scaling factors. Filter control circuit 700 comprises a look up table 150. Look up table 150 stores a plurality of selectable XY pairs of adjustment factors for X 154 and Y 156. Each XY pair of the table corresponds to one of the filter control setting 152 of table 150. In the example illustrated in FIG. 6, eight possible filter control settings, e.g., 0 through 8 are provided. To select scaler adjustment factors X and Y a filter control signal representing one of the eight control settings is provided at filter control input 688 of table 150, The XY value pair corresponding to the filter control setting selected by input 688 provides adjustment factors X and Y to first and second adjusters 655 and 657. In that manner, lookup table 150 provides adjustable scaling factors for scalers 655 and 652.

In one embodiment of the invention, the X and Y values of table 150 maintain a given relationship between scaling factors α and β while permitting adjustment of scaling factors α and β. In one embodiment of the invention, the given relationship between α and β is a unity gain relationship given by:

β=1+α.

FIG. 7 is a more detailed diagram of one embodiment of the filter illustrated in FIG. 6. A video signal representing pixel data set 620 is provided to full line delay registers 803 and 805. Line delay registers 803 and 805 delay the video signal by an entire line of displayed video according to one embodiment of the invention. For the purpose of the present example, the delays of line delay registers 803 and 805 are chosen according to the principles illustrated by the following example. When the data for pixel M, for example, is presented at input 620, the output of line delay register 805 will be H and the output of line delay register 803 will be C. As illustrated in FIG. 7, the output of line delay registers 805, 803 and the original video input signal, e.g., M are coupled respectively to a second bank of delay registers 807, 809, and 800. The outputs of delay registers 803 and 800 are added by adder 812. The output of adder 812 is provided to a first input of adder 823.

A second input to adder 823 is provided as follows. An output of delay element 809 is provided to delay element 811. The output of delay element 811 is provided to one input of adder 813. The other input to adder 813 is provided by the output of delay element 807. A sum output of adder 813 is coupled to the second input to adder 823.

According to the example above, the sum H+L+B+F. is provided. Pixels H, L, B and F are pixels overlapping pixel G in matrix 450 of FIG. 1. This sum represents a sum of pixel intensity values for each of the pixels that overlap pixel G. The sum H+L+B+F is then scaled by a scaling factor α. Scaling is accomplished in one embodiment of the invention as follows. The sum H+L+B+F is provided to multiplier 814. Multiplier 814 multiplies the sum H+L+B+F accordance with a first multiplier X, indicated at multiplier input 655. The output of multiplier 655 is provided to divider 651. In the embodiment illustrated In FIG. 7 divider 651 divides the output or multiplier 655 by 32. Therefore, the sum (H+L+B+H) output from adder 823 is scaled by a factor of x/32, where 32 is a constant and x/32 comprises scaling factor α. For example if x=4 in FIG. 7, then α=4/32 or 1/8. Accordingly, the scaled sum for pixels in the example above is (1/8)(H+L+B+F).

Similarly, a second scaling factor β is applied to pixel data value G by providing data value G to multiplier 804. The output of multiplier 804 is provided to a 1/8 divider 652. Therefore, G is scaled by a factor of y/8 comprising scaling factor β. A subtractor 817 provides an output representing the difference between the scaled pixel intensity data value β (G) and the scaled sum of the intensity values of overlapping pixels, i.e., (α)(H+L+B+F).

In one embodiment of the invention the output of subtractor 817 is provided to a limiter 654. Limiter 654 maintains the difference value provided by subtractor 817 within a range of pixel intensity values. According to one embodiment of the invention, various additional delay registers, e.g., 819 are provided in the filter circuit in FIG. 7 to allow for circuit settling times.

It will be appreciated by those of ordinary skill in the art that various other relationships between β and α, e.g., other than unity gain relationships, are possible. Table 600 is suitable for implementing a wide variety of relationships. The other relationships can readily be accomplished by substituting appropriate values of x y pairs in table 600. Advantageously the pairs are customizable such that a specific relationship is maintained between β and α for all values of x and y pairs on the table.

According to one embodiment of the invention, look up table 150 is implemented in a memory (not shown), for example, a semiconductor memory. In that case, the memory stores values of x and y. The memory includes x and y outputs coupled to inputs x (indicated at 655) and y (indicated at 657) respectively of filter 645 of FIG. 7. In a look up table embodiment comprising eight x,y pairs, x is selectable such that α ranges in 1/32 increments between 0 to 7/32. For the same table, y is selectable such that β ranges from 1 to 15/8 in increments of 1/8.

Those skilled in the art will readily appreciate that the foregoing filters are capable of implementation in various combinations of software, hardware and/or firmware. According to one embodiment of the invention, look up table values are stored in an electronic memory. For example, data sets can be stored in a bus register, RAM or other data storage device associated with a DLP system microprocessor. Still, the invention is not limited in regard to memory types, and other suitable methods exist for storing such values. In one embodiment of the invention, filter control values are selectable by a user via a user operable interface with a DLP display system. According to another embodiment of the invention, filter control values are automatically adjusted by a system microprocessor (not shown) provided for controlling the DLP system.

Further, while FIGS. 5 and 7 represent embodiments of filters according to the invention, those skilled in the art will recognize that the invention is not limited to particular component arrangements. For example, other filter architectures are possible for implementing the invention. That is, other filter architectures are suitable for operating on pixel values so as to adjust pixel intensity to at least partially compensate for the intensity distortion caused by overlapping pixels. Further, while it is be advantageous in many embodiments of the invention to select β=1+4α, the invention is not limited in this regard to such values. The values of β and α are selectable to have other values and relationships according to various embodiments of the invention.

Improved Response to Dynamic Range Limits

The pixel filtering and processing techniques described above act to restore original picture sharpness lost through certain types of pixel processing, for example, smooth pixel processing. However, regardless of the filtering techniques employed, transient peaks in pixel brightness levels will sometimes exceed the dynamic range of signal paths. Dynamic range limiters are frequently employed to clip transient brightness levels. That is, a dynamic range limiter reduces the brightness value of pixels that exceed the dynamic range capabilities of the display device in the system. The clipping amount is based on the difference between the pixel brightness value and the dynamic range limit of the signal path. As a result of clipping, washout of the displayed picture can result.

To illustrate this concept, an example set of pixel brightness values is shown in Table 1 below. For this example, zero represents black, 50 represents gray and 100 represents maximum white. Therefore, the example picture comprises a single white pixel (100) on a gray background (50).

TABLE 1

| example input signal | | | | |
|---|---|---|---|---|
| 50 | 50 | 50 | 50 | 50 |
| 50 | 50 | 50 | 50 | 50 |
| 50 | 50 | 100 | 50 | 50 |
| 50 | 50 | 50 | 50 | 50 |
| 50 | 50 | 50 | 50 | 50 |

As described above with reference to FIG. 3, an example filter includes filters 320a, 320b, 320c. Each filter is a two-dimensional filter that convolves the pixels of each image with an array h defined by:

$$\begin{matrix} & -\alpha & \\ -\alpha & \beta & -\alpha \\ & -\alpha & \end{matrix}$$

wherein β is a scaling factor associated with the pixel from which the intensity distortion is to be removed; and α is a scaling factor for respective corresponding adjacent pixels that are contributing to the distortion.

For this example, the filters of FIGS. 3 and 6 comprise the example values shown in Table 2.

TABLE 2

|  | −1/8 |  |
|---|---|---|
| −1/8 | 3/2 | −1/8 |
|  | −1/8 |  |

Table 3 shows pixel brightness values that would be provided to the display after sharpening by the filter of FIGS. 3 and 6.

TABLE 3

| 50 | 50 | 50  | 50 | 50 |
|----|----|-----|----|----|
| 50 | 50 | 44  | 50 | 50 |
| 50 | 44 | 125 | 44 | 50 |
| 50 | 50 | 44  | 50 | 50 |
| 50 | 50 | 50  | 50 | 50 |

As can be seen from Table 3, filtering makes the white pixel "whiter than white". The adjacent pixels are slightly darker than the gray background value of 50. For embodiments of the filter of FIGS. 3 and 5 employed in a system having a dynamic range sufficient to accommodate a pixel value of 125, the filter would produce the intended sharpening effect. However, in one example application, the dynamic range for pixel values is restricted to a maximum value, for example 100. In the case of a maximum value of 100, the output of the filter is shown in Table 4.

TA3/24

| 50 | 50 | 50  | 50 | 50 |
|----|----|-----|----|----|
| 50 | 50 | 44  | 50 | 50 |
| 50 | 44 | 100 | 44 | 50 |
| 50 | 50 | 44  | 50 | 50 |
| 50 | 50 | 50  | 50 | 50 |

The brightness values given in Table 4, when provided to the display, could produce the appearance of a "washed out" white dot. Therefore, embodiments of the invention include methods and apparatus for compensating for the effects of such dynamic range limitations. Embodiments of the invention further provide the advantage of adaptively compensating the effects of dynamic range limitations. In that way, embodiments of the invention apply compensation on a pixel by pixel basis. The amount of compensation is based upon a predicted amount by which pixels surrounding or adjacent to, a given pixel in an image will be clipped. In one embodiment of the invention, the amount of clipping is evaluated and the compensation is applied by adjusting pixel values in accordance with the expected amount of clipping. In that manner, embodiments of the invention avoid applying more compensation than is optimal for a given area of a displayed image. Embodiments of the invention adjust pixels by amounts sufficient to reduce clipping while maintaining overall brightness. To accomplish this, embodiments of the invention reduce values of pixels expected to exceed the dynamic range limits of the system. At the same time, values of nearby pixels that are not expected to exceed the dynamic range limits are increased.

Figure 8:
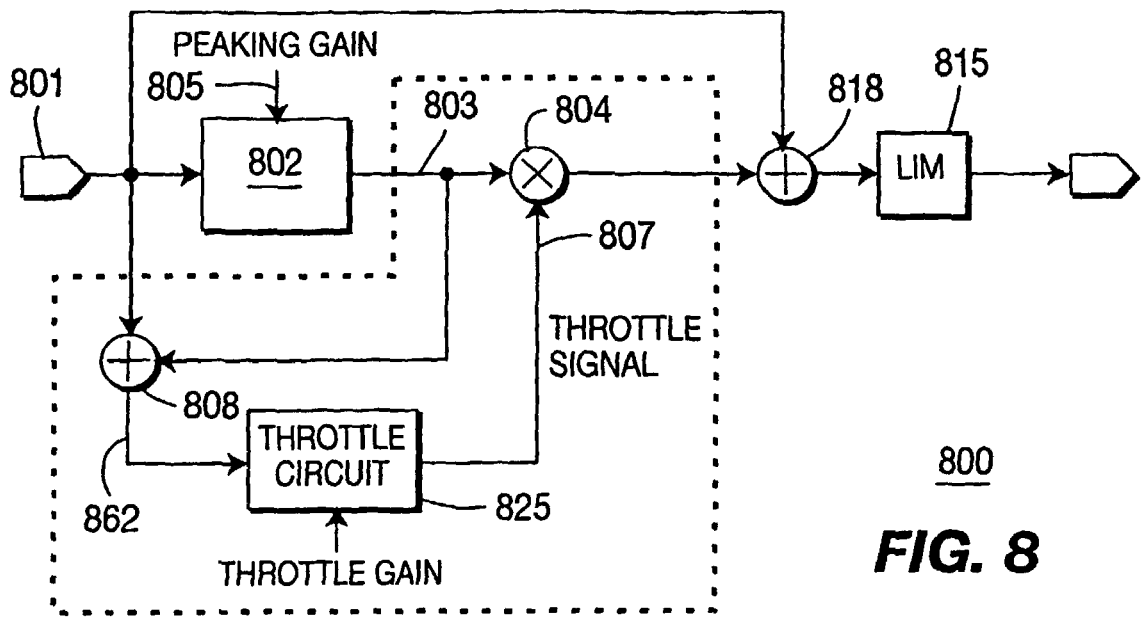
FIG. 8 is a block diagram of a throttle circuit according to an embodiment of the present invention.

FIG. 8 illustrates an adaptive filter 800 according to an embodiment of the invention. A throttle circuit 825 receives successive pixel brightness values at 801. The successive values are also provided to pixel brightness processor 802 for brightness processing. The brightness processed pixels from pixel brightness processor 802 are provided to throttle circuit 825. Throttle circuit 825 adaptively processes each pixel at input 801 based on the dynamic range limits of the signal path between brightness processor 802 and the system display (an example display is illustrated in FIG. 3 at 499). Throttle circuit 825 provides a throttle signal 807. Throttle signal 807 is applied to the output of brightness processor 802 to decrease brightness of pixels exceeding the dynamic range limits of the signal path, while maintaining the overall brightness of the displayed image.

In one embodiment of the invention pixel brightness processor 802 is a filter. In one embodiment of the invention, pixel brightness processor 802 is any of the filters described hereinabove and as illustrated by FIGS. 2-7. In one embodiment of the invention, pixel brightness processor 802 includes a peaking gain adjustment 805.

SLM systems like the example illustrated in FIG. 1 process pixel brightness data for a variety of purposes. One reason is to compensating the image for brightness variations due to overlapping pixels in a staggered pixel display like the one illustrated in FIG. 3 at 410. For other embodiments of the invention pixel brightness is compensated in accordance with a gamma, or de-gamma function. In other embodiments of the invention, pixel brightness is compensated for a light source that has a particularly intense primary component for a given primary color. In one embodiment of the invention, pixel brightness processor 802 is a peaking filter. In one embodiment of the invention pixel processor 802 is a peaking filter of the type illustrated in FIG. 5. Other embodiments of the invention include pixel processors for sharpening and other image and pixel brightness translation functions. In particular, the invention is suitable for use with any processor 802 or filter that performs high frequency emphasis filtering of the type that can result in transient peaks in pixel brightness values beyond the dynamic range of the signal path.

Regardless of the type of pixel brightness processing, pixel processor 802 processes the incoming pixel data and provides a brightness processed output 803. Processed output 803 is scalable by scaler 804. According to the embodiment illustrated in FIG. 8, the scaled output of scaler 804 is added to the input signal at 801 by adder 818. The output of adder 818 is provided to limiter 815. As discussed above, limiter 815 limits the pixels values exceeding the brightness range appropriate for the display device. After the pixel data is processed and limited, it is formatted by data formatting logic and displayed using a display (For one example display, see FIG. 3 at 499).

According to one embodiment of the invention, filter 800 comprises a throttle circuit 825 and a scaler 804. The input 862 of throttle circuit 825 is coupled to pixel processor 802 via adder 808. Processor Input 801 and processor output 803 are coupled to inputs of adder 808. A throttle signal 807 is provided at an output of throttle circuit 825. Throttle signal 807 acts as a variable scaling factor for scaler 804. Throttle circuit 825 receives both incoming pixel data 801 and processed pixel data 803 via adder 808. For any given incoming pixel at 801, throttle circuit 825 determines if pixels adjacent to and including the incoming pixel are likely to have brightness values exceeding the range of limiter 815.

For example, in FIGS. 4A and 4B, a first pixel set and a second pixel set are respectively illustrated. A displayed pixel matrix including both the first and second pixel sets is represented by FIG. 4C. The first pixel set includes an example given pixel, G. For pixel G of incoming pixel data, pixels H, L, B and F of the second pixel set are adjacent to pixel G in the displayed pixel matrix.

Returning now to FIG. 8, and discussing an example pixel G, throttle circuit 825 estimates the amount of clipping to be applied by limiter 815 to at least one of pixels G, H, L, B and F, based on pixel values comprising peaked video signal 862. Throttle circuit 825 provides an output signal based upon the amount by which brightness values of pixels G, H, L, B and F at input 862 exceed the dynamic range limits. Then throttle circuit 825 provides a throttle signal output that adjusts the corresponding pixel value at the output of peaking filter 802 based on the amount by which the brightness value pixel exceeds the dynamic range limits. In this way peaking is selectively applied to pixels of the input signal at input 801. Selection is based on brightness values of pixels comprising a portion of the image represented by input signal 801.

Alternative embodiments of the invention are suitable for use in systems employing only one pixel set to display a frame of data. In other words, embodiments of the invention are suitable for use in systems that do not employ smooth pixel, or staggered pixel techniques. In that case, adjacent pixels comprise neighboring pixels to a given pixel. In one embodiment of the invention, if throttle circuit 825 determines that processing by processor 802 will result in clipping of the given pixel, or an adjacent pixel, throttle circuit 825 adjusts throttle signal 807. The amount of adjustment of throttle signal 807 is based upon the amount of clipping to be applied to the given pixel or an adjacent pixel. In one embodiment of the invention the adjustment amount is sufficient to restrict the brightness value of the adjacent pixel to a value approximately within the dynamic range limits of dynamic range limiter 815.

Scaler 804 scales brightness values of pixels at the output 803 of pixel processor 802 based upon throttle signal 807. In an adaptive embodiment of the invention, throttle signal 807 scales the brightness values of adjacent pixels on a pixel by pixel basis. Therefore, each pixel will be processed in accordance with its corresponding adjacent pixels. Thus a different scaling factor is applied based upon the optimal scaling for each portion of the displayed image. In that manner, throttle circuit 800 adaptively adjusts a sharpening level to accommodate dynamic range limitations.

In one embodiment of the invention, processor 802 comprises a peaking filter. Peaking filter output 803 is provided to scaler 804. Scaler 804 scales peaked output values in accordance with throttle signal 807. The output of scaler 804 is provided to limiter 815.

Figure 9:
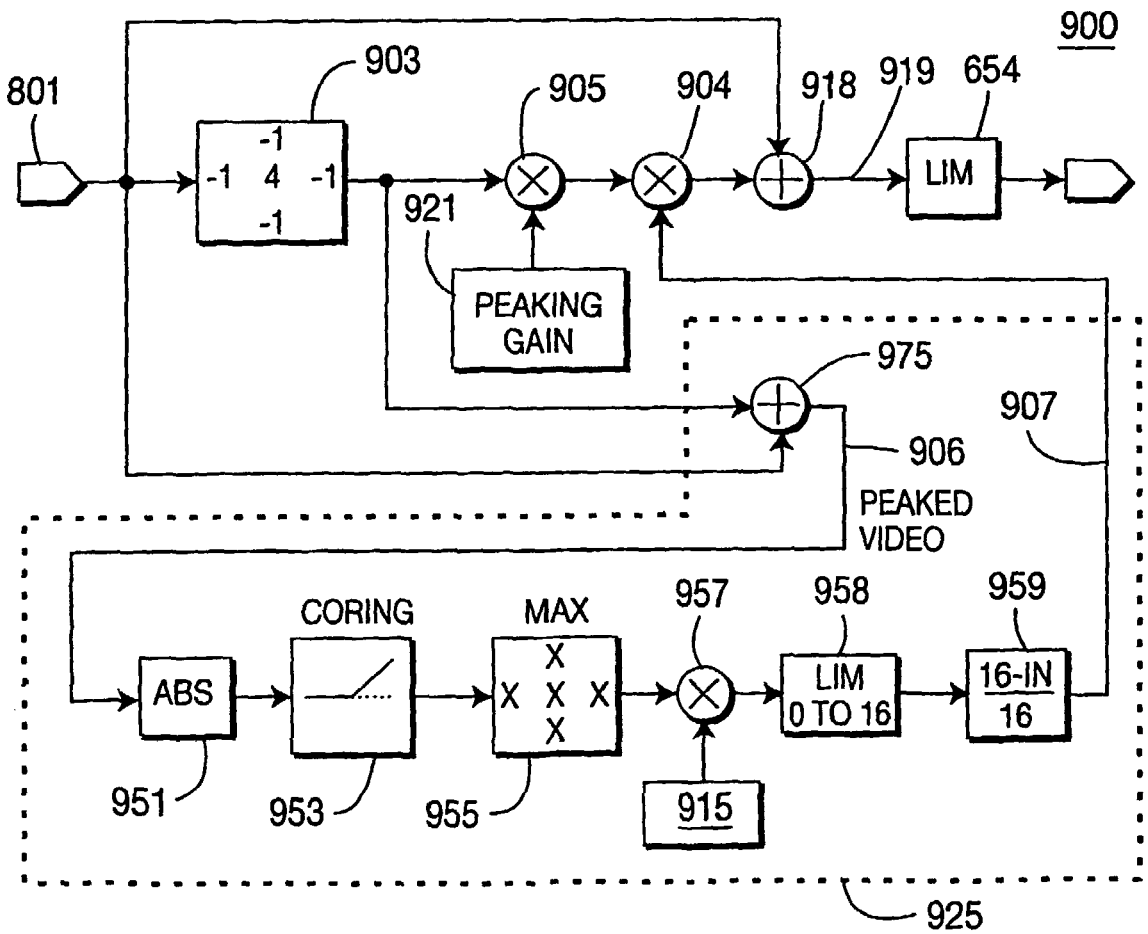
FIG. 9 is a block diagram showing more details of the throttle circuit illustrated in FIG. 8

FIG. 9 illustrates the throttle circuit of FIG. 8 in more detail. Successive pixels to be processed are provided to an input 801 of a filter arrangement 900 according to one embodiment of the invention. In an embodiment employing a filter as described in conjunction with FIG. 3 at 320, filter 903 comprises a two-dimensional filter that convolves successive pixels of each image with an array h defined by:

$$\begin{matrix} & -\alpha & \\ -\alpha & \beta & -\alpha \\ & -\alpha & \end{matrix}$$

In the example illustrated in FIG. 9, the example array values are:

$$\begin{matrix} & -1 & \\ -1 & 4 & -1 \\ & -1 & \end{matrix}$$

It is important to note the example values provided above are for illustration and discussion purposes. A wide variety of array values are possible and are determined as described above in reference to FIGS. 2-7 for various embodiments of the invention. In the embodiment illustrated in FIG. 9, a gain control 905 is provided for filter 903. In some embodiments of the invention, gain control 905 operates in a manner similar to the gain control illustrated in FIGS. 5 and 6.

The output of gain control 905 is provided to scaler 904. Scaler 904 scales the output of gain control 905 in accordance with a throttle signal 907 provided by throttle circuit 925. In one embodiment of the invention, the output of scaler 904 is combined with the signal at input 801 by a combiner, for example, an adder 918. The output of adder 918 is provided to limiter 654. Limiter 654 clips the output of adder 918 by an amount sufficient to adjust the brightness value of the output pixels to be within the dynamic range for the display.

In an alternative embodiment of the invention, processor 802 of FIG. 8 is embodied as a two-dimensional high-pass array, indicated at 903 in FIG. 9. In one embodiment of the invention, the output of high pass array 903 is provided to a multiplier 905. According to one embodiment of the invention, the output of high pass array 903 is a peaking signal. The peaking signal is used to "peak" the video signal input at 801. Multiplier 905 adjusts the amplitude of the high-pass array 903 output, and therefore the peaking signal, in accordance with a value stored in a control register 921 so as to provide a "peaking gain" to the output of high pass array 903. In on embodiment of the invention, the peaking gain is adjustable, for example by a technician in one embodiment, and a viewer in another embodiment, for optimal peaking of the input video signal based upon the perceived quality of the displayed video image. An output of multiplier 905 is provided to scaler 904 and to adder 975. Scaler 904 couples the peaking signal to adder 918. Adder 918 combines the peaking signal with input video signal 801. Input signal 801 is also provided to adder 975. The output of adder 975 is a peaked video signal 906. This peaked video signal is provided to throttle circuit 925. According to embodiments of the invention, throttle circuit 925 comprises an absolute value circuit 951, a coring circuit 953, and filter 955. Together with scaler 904, throttle circuit 925 comprises a circuit for peaking video signals according to an embodiment of the invention.

According to one embodiment of the invention, throttle circuit 925 scales, for example by fractional multiplying, the peaking signal output from multiplier 905 thereby adjusting the peaking signal. The amount of peaking applied to the input video signal 801 is based on the peaking signal. In one embodiment of the invention the gain of peaking signal is derived from a value stored in register 915. In one embodiment of the invention the gain is variable so as to provide between 0 gain and unity gain for the peaking signal.

An example case where throttle circuit 925 provides unity gain for the peaking signal output of filter 903 will now be discussed. The output of high pass array 903 is adjusted by circuit 905 in accordance with the value provided by register 921. The adjusted high-pass array output is scaled by multiplier 904 and the scaled output of multiplier 904 is added by adder 918 to the signal at input 801. Adder 918 provides the sum as output signal 919 to limiter 654. Limiter 654 restricts, for example by clipping, the value of output signal 919 such that the value remains approximately within the dynamic range limitations of the subsequent signal path, for example the signal path between the limiter output and the display.

If the throttle signal 907 output of throttle circuit 925 were unity under all conditions, this system would behave in a similar manner to the filter illustrated in FIGS. 1-7 herein. However, according to various embodiments of the invention, the throttle signal 907 is variable. In one embodiment throttle signal 907 is variable between zero and one. In other embodiments of the invention, other adjustment limits for throttle signal 907 are provided. In one embodiment of the invention, a value of zero completely inhibits peaking, while a value of one allows peaking as determined by filter 903 without throttling. According to an embodiment of the invention, throttle signal 907 is adaptively controlled in response to throttle circuit 925.

Throttle circuit 925 evaluates the amount of clipping to be applied to portions of the video images represented by video input signal 801. According to one embodiment of the invention, throttle circuit 925 comprises an absolute value circuit 951 coupled to an input of a coring circuit 953. The output of coring circuit 953 is provided to spreading circuit 955.

In one embodiment of the invention, peaked video signal 906 is provided to absolute value circuit 951. Absolute value circuit 951 determines absolute values of successive pixels of peaked video signal 906. In effect, absolute value circuit 951 folds together positive and negative values of successive incoming pixels of peaked video signal 906, with respect to the center of the range of the incoming pixel values.

The output of absolute value circuit 951 is coupled to coring circuit 953. Coring circuit 953 provides a threshold corresponding to the most positive and most negative unclipped pixel values at its input. In one embodiment of the invention, coring circuit 953 evaluates pixels at its input with respect to the clipping threshold. In one embodiment of the invention, coring circuit 953 applies a non linear function to pixels at its input to evaluate pixel brightness with respect to the clipping threshold.

The output of coring circuit 953 is provided to a spreading circuit 955. In one embodiment of the invention, spreading circuit 955 comprises a two-dimensional Filter that receives successive pixels provided by coring circuit 953. Spreading circuit 955 evaluates a portion of the video signal comprising a given pixel and its neighboring pixels as represented by array I. For each successive input value to spreading circuit 955, a corresponding spread clipping estimate output is provided at the output of spreading circuit 955. The spread clipping estimate corresponding to a given input value is determined as follows. For each given successive input value, a corresponding "max" pixel of array I is identified. The max pixel value is the highest value in array I.

Spreading circuit 955 provides a spread clipping estimate x. X is a scaler that adjusts the brightness of the max pixel by an amount sufficient to bring the brightness value of the max pixel within the dynamic range enforced by limiter 654. Throttle signal 907 is based on the spread clipping estimates.

According to one embodiment of the invention, the output of spreading circuit 955 is gain adjusted by a multiplier 957. According to one embodiment of the invention, the multiplication factor for multiplier 957 is provided by a control register 915. In one embodiment of the invention, control register 915 stores a value (referred to herein as throttle gain) to be applied to the output of spreading circuit 955 to adjust the gain of throttle signal 907. According to one embodiment of the invention, the output of multiplier 957 is limited by limiter 958 and inverted by inverter 959. Thus, according to one embodiment, a polarity and range setting circuit is provided for throttle signal 907.

The circuit described above reduces the amount of peaking in vicinities where limiting is predicted to occur, and prevents the washout of white or black detail. According to various embodiments of the invention, circuits 903 and 955 are implemented by employing a plurality of line delays. For example, in one embodiment of the invention, a line delay arrangement as suggested by the circuit illustrated in FIG. 7 is employed for circuits 903 and 955. According to one embodiment of the invention, the number of line delays is chosen so as to implement circuit 903 and 955 for predicted limiting one line above and one line below the lines calculated by high-pass array 903. For example, to implement an embodiment of the invention as shown in FIG. 9, four line delays are utilized. Two line delays provide high-pass array 903 with simultaneous access to three vertically aligned pixels. Similarly, one embodiment of spreading circuit 955, as shown in FIG. 9, is implemented with two additional line delays to permit the calculations described above.

One embodiment of the circuit illustrated FIG. 9 comprises two line delays, thereby saving the total amount of line delays for this embodiment. This embodiment is implemented by approximating the high-pass array 903 represented by X's in spreading circuit 955. According to an embodiment of the invention, an approximation used for high-pass arrays implementing the X's of spreading circuit 955 is shown in Table 7. The approximation comprises two arrays. Examples of the two arrays are illustrated in Table 7.

TABLE 7

|    | −1 |    |    | 0  |    |
|----|----|----|----|----|----|
| −1 | 3  | −1 | −1 | 3  | −1 |
|    | 0  |    |    | −1 |    |

Using the approximations of table 7 obviates the need for delays associated with zero coefficients. This is but one embodiment of the invention that has been found to provide good performance.

According to the various embodiments of the invention, other and further embodiments of the invention may be devised without departing from the basic scope thereof, and the scope thereof is determined by the claims that follow.

The invention claimed is:

1. A circuit for peaking video signals representing video images to be provided to a dynamic range limiter for display on a display device, the circuit comprising:
a peaking filter including a filter input configured to receive said video signal, a first filter output for providing a peaking signal for said video signal, and a second filter output providing a peaked video signal based upon said peaking signal;
a throttle circuit including a throttle input coupled to said second filter output and a throttle output providing a throttle signal based upon said peaked video signal;
a scaler coupled between said first filter output and said dynamic range limiter, said scaler further coupled to said throttle output;
said scaler adjusting said peaking signal based upon said throttle signal such that peaking is adaptively applied to said video signal based upon dynamic range limits of said dynamic range limiter and brightness of portions of said video images.

2. The circuit of claim 1 wherein said throttle circuit comprises:
a clipping estimator coupled to said second filter output;
a spreading circuit coupled to said clipping estimator and providing a spread clipping estimate;
said throttle signal based, at least in part, upon said spread clipping estimate.

3. The circuit of claim 2 wherein said clipping estimator comprises an absolute value circuit.

4. The circuit of claim 2 wherein said spreading circuit comprises a filter configured to provide a spread clipping estimate for successive portions of a video image comprising said video signal and to provide said throttle signal based upon said spread clipping estimate such that peaking levels are adjustable for successive portions of said video image.

5. The circuit of claim 1 further comprising a throttle signal gain adjusting circuit coupled to said throttle output.

6. The circuit of claim 1 further comprising a peaking gain adjusting circuit coupled to said second output of said peaking filter.

7. The circuit of claim 1 wherein said video signal comprises first and second pixel sets, said first and second pixel sets comprising a frame of an image for display on a display device, said scaler adaptively adjusting said peaking signal based upon said throttle signal such that dynamic range limiting of said peaked video signal for said first and second pixel sets is minimized in a region of said frame of said image.

8. The circuit of claim 1 further comprising a polarity and range adjusting circuit, said polarity and range adjusting circuit providing a polarity and range adjusted throttle signal to said scaler.

9. A method for adaptively peaking a video signal to be provided to a dynamic range limiter, the method comprising:
 filtering said video signal to provide a peaking signal for said video signal;
 peaking said video signal in accordance with said peaking signal to provide a peaked video signal;
 estimating clipping to be applied to said peaked video signal by said dynamic range limiter;
 adjusting said peaking signal in accordance with said estimated clipping to minimize dynamic range limiting of said peaked video signal.

10. The method claim of claim 9 wherein said estimating step comprises:
 determining absolute values corresponding to said peaked video signal;
 convolving said absolute values to predict clipping for successive portions of a video image comprising said video signal;
 adjusting said peaking signal in accordance with said clipping such that dynamic range limiting is minimized for portions of said video image where clipping is predicted.

11. The method of claim 9 wherein said adjusting step is carried out by adjusting said peaking signal to minimize clipping for portions of said video image where clipping exceeds a predetermined clipping level.

12. The method of claim 9 wherein said adjusting step is carried out by providing a throttle signal, and further including a step of adjusting the gain of said throttle signal.

13. The method of claim 12 further including a step of adjusting a polarity and range of said throttle signal.

* * * * *